Nov. 8, 1927.
C. H. HARTMAN
1,647,992
ADJUSTABLE LEVELING FOOT FOR SCALE BASES
Filed Oct. 8, 1923
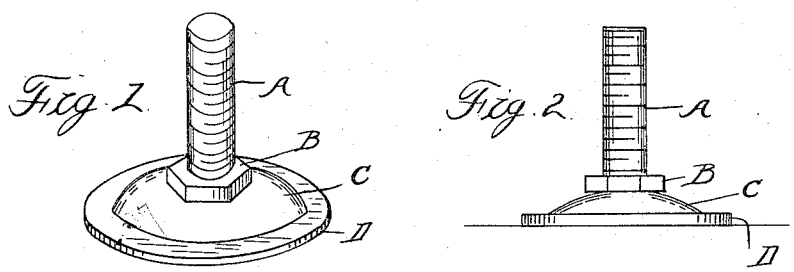
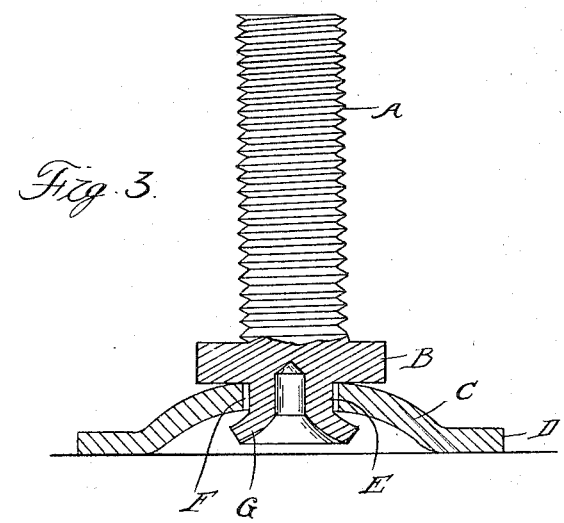
Inventor
Charles H. Hartman
By Whittemore Hulbert Whittemore
   Belknap    Attorneys Patented Nov. 8, 1927.

1,647,992

UNITED STATES PATENT OFFICE.

CHARLES H. HARTMAN, OF LOUISVILLE, KENTUCKY, ASSIGNOR TO WALTER F. STIMPSON, OF LOUISVILLE, KENTUCKY.

ADJUSTABLE LEVELING FOOT FOR SCALE BASES.

Application filed October 8, 1923. Serial No. 667,401.

It is the object of the invention to obtain a construction of adjustable foot which is simple, durable, can be manufactured at low cost and which provides the necessary universal movement for resting on an irregular floor.

In the drawings:

Figure 1 is a perspective view;

Figure 2 is a side elevation;

Figure 3 is an enlarged vertical central section through the universal joint.

In the present state of the art adjustable feet for scales have been provided with ball and socket universal joints, which permit universal pivoting of the base flange upon the securing shank. With such constructions the base is retained only by a thin flange, which is spun over the ball, and it frequently happens that in use the parts become detached. With the present construction I avoid the necessity of forming a ball and socket joint, thereby lessening the cost of manufacture, and have substituted a much simpler and stronger connection, which, while not being capable of as great a degree of angular adjustment, has all that is necessary for practical use.

In detail, A is the shank member which is threaded for engagement with the threaded socket in the scale base. B is a polygonal head at the lower end of this shank, which forms a means of adjusting the same.

C is the base member in the form of an upwardly dished disk having a flattened peripheral portion D for resting upon the floor. E is a downwardly extending pin integral with the shank A and passing through a central aperture F in the disk with sufficient clearance for limited angular movement. The lower end of this pin G is centrally bored and is then expanded to form an annular retaining flange G. This flange is located within the space formed by the dishing of the disk, so that it will not interfere with the resting of the base on the floor. There is also sufficient clearance between the flange and the disk to permit of limited angular movement.

With the construction described, the flange G will strongly attach the disk to the shank, so that there will be no danger of the two parts becoming detached in ordinary use. On the other hand, sufficient angular movement is permitted by this attachment so that when the periphery of the base is in full contact with the floor, the shank will be out of perpendicular relation thereto.

What I claim as my invention is:

A foot member comprising an upwardly dished concavo-convexed centrally apertured disk, a shank having a head bearing on the upper convexed face of said disk, a pin projecting downwardly from said head extending through the aperture in the disk, and a retaining flange on said pin within the dish of the disk, there being sufficient clearance for angular movement of the shank with respect to the disk.

In testimony whereof I affix my signature.

CHARLES H. HARTMAN.